United States Patent [19]

Adler-Nissen

[11] 4,100,024

[45] Jul. 11, 1978

[54] HYDROLYSIS OF SOY PROTEIN

[75] Inventor: Jens Lorenz Adler-Nissen, Copenhagen, Denmark

[73] Assignee: Novo Industri A/S, Bagsvaerd, Denmark

[21] Appl. No.: 758,776

[22] Filed: Jan. 12, 1977

[30] Foreign Application Priority Data

Jan. 19, 1976 [GB] United Kingdom ............... 2042/76

[51] Int. Cl.² ............................................. A23L 1/20
[52] U.S. Cl. ........................................ 195/29; 426/46
[58] Field of Search ............... 195/29.4; 426/46, 18, 426/44, 52, 53

[56] References Cited

U.S. PATENT DOCUMENTS

| | | | |
|---|---|---|---|
| 3,843,802 | 10/1974 | Puski | 426/46 |
| 3,846,560 | 11/1974 | Hempenius et al. | 426/18 |
| 3,876,806 | 4/1975 | Hempenius et al. | 426/46 |
| 3,970,520 | 7/1976 | Feldman et al. | 195/29 |

OTHER PUBLICATIONS

Chiang et al., Chemical Abstracts, vol. 78, 1973, 27916a.

*Primary Examiner*—Lionel M. Shapiro
*Attorney, Agent, or Firm*—Fidelman, Wolffe & Waldron

[57] ABSTRACT

Preparation of polypeptides from soy protein through hydrolysis with a microbial, alkaline, proteinase using enzyme concentrations of 4–25 Anson units per kg of soy protein, a substrate concentrtion of 5–20% w/w soy protein and pH 7–10, hydrolyzing to a (DH) degree of hydrolysis 8–15% then inactivating the enzyme by addition of a food grade acid, and thereafter recovering the supernatant polypeptide solution.

Preferred are the proteinase from *B. licheniformis*, pH 7.5–8.5, 8–15% substrate, and hydrolysis to a DH 9.5–10.5 %.

The product is free from bitterness.

7 Claims, No Drawings

HYDROLYSIS OF SOY PROTEIN

THE INVENTION

The present invention relates to a process for the preparation of polypeptides which are soluble in aqueous media with pH's in the range of from 2 to 7 and which are derived from soy protein and are suitable for use as an additive for low protein acid food products, and to the polypeptides so prepared.

Examples of low protein acid food products are beverages, including soft drinks, for example carbonated soft drinks, marmelade and jams.

In the low protein acid food products arts, there is a need for cheap (or relatively cheap) polypeptides which are soluble at the pH of the food product and which are derived from soy protein, in order to enhance the nutritional value of the low protein acid food product. However, use of the polypeptides heretofore available which are soluble at the pH of the food product derived from soy proteins by enzymatic hydrolysis is accompanied by several problems, predominantly the bitter taste of some of the lower molecular weight polypeptides in the soy protein hydrolysate.

It is an object of the present invention to provide a process to prepare polypeptides which are soluble at the pH of the food product (pH 2 to 7) derived from soy protein by enzymatic hydrolysis and which are suitable for use as an additive to low protein acid food products without creating any significant bitter taste.

The process of the present invention prepares polypeptides soluble in aqueous media of pH's in the range of from 2 to 7 from soy protein by hydrolyzing soy protein with microbial, alkaline proteinase in a concentration which corresponds to a proteolytic activity in the range of from 4 to 25 Anson units per kg soy protein at a substrate concentration of between 5 and 20% w/w soy protein, preferably 8-15% w/w soy protein, at a pH in the range of from 7 to 10. Desirably the temperature is between about 15° C below the temperature optimum and the temperature optimum for the enzyme. Hydrolysis is carried out until a degree of hydrolysis (DH) in the range of from about 8 to about 15%, preferably from 9 to 12%, and more preferably 9.5-10.5% is attained, whereupon the enzyme is inactivated by reduction of pH through addition of a food grade acid preferably to a pH of 4.2 or lower, whereafter the supernatant is separated from the precipitate and treated with activated carbon.

By the term "soy protein" as used herein is meant any form of soy concentrate or soy isolate, which may for example be a commercial soy concentrate or soy isolate or of course the soy concentrate or soy isolate intermediate produced in a plant adopted to conversion of defatted soy meal to polypeptides. The soy protein concentration referred to above with reference to the proteolytic activity of the enzyme and to the substrate concentration is calculated as the percentage of nitrogen measured according to Kjeldahl multiplied by 6.25.

The term "alkaline proteinase" is defined in N. Hennrich, "Spaltungsspezifität von Protease 2", Merck's Kontakte 2/73, page 5.

The enzyme activity referred to above in terms of Anson units is determined according to the modified Anson method described in NOVO ENZYME INFORMATION 1B no. 058 e-GB (the original Anson method is described in J. Gen. Physiol., 22, 79–89 (1939).

The proteolytic activity is a critical parameter in the hydrolysis: if the proteolytic activity falls below 4 Anson units per kg soy protein, the hydrolysis rate is too slow, i.e. the reaction time is unsatisfactorily low. If on the other hand the proteolytic activity is above 25 Anson units per kg soy protein, the enzyme cost will be excessive. According to practice of the invention substrate concentration and enzyme activity are related so that hydrolysis is carried out on the relatively flat, upper part of the Michaelis-Menten plot for the enzyme and soy protein.

At a high pH value, i.e. around pH 10, the hydrolysis rate is high, but on the other hand a relatively high amount of acid has to be added at the later inactivation stage which might even be harmful to the product for organoleptic reasons. At a low pH value around 7 the hydrolysis rate is low, but on the other hand less acid is needed for inactivation of the enzyme. Yet only the alkaline proteinase are believed to be productive of the desired hydrolysate product.

The temperature optimum referred to above is determined according to the above described modified Anson method (reaction time 10 minutes), which of course is further modified in that a series of substrates are incubated at different temperatures and analyzed in order to establish the temperature activity curve and the maximum thereof, the corresponding temperature being the temperature optimum.

The degree of hydrolysis (DH) is defined by the equation $$DH = \frac{\text{Number of peptide bonds cleaved}}{\text{Total number of peptide bonds}} \times 100\%$$

Reference is made to J. Adler-Nissen, J. Agr. Food Chem. 24, Nov.-Dec. 1976 for a more detailed discussion of the degree of hydrolysis (DH).

The number of the peptide bonds cleaved can be measured by means of the ninhydrin method. The ninhydrin method is described in Moore, S. Stein, W.H., "Photometric Ninhydrin Method for use in the Chromatography of Amino Acids", J. Biol. Chem., 176, 367–388 (1948).

Thus practice of this invention involves halting hydrolysis before it proceeds to a level where the bitter taste of low molecular weight polypeptides appears in the hydrolysate. Since the enzymatic action solubilizes otherwise insoluble protein matter as well as hydrolyzes the solubilized proteins it is noteworthy that complete solubilization of the soy protein does not take place. As much as 40% of the initial protein content remains undissolved, and is removed from the (supernatant) polypeptide solution, e.g. by centrifugation, filtration or decantation.

The DH can also be determined if the course of hydrolysis is followed by means of the pH-STAT method, as described by Jacobsen, C.F., Leonis, J., Linderstrom-Lang, K., Ottesen, M. in "Methods of Biochemical Analysis", Vol. IV, pp. 171–210, Interscience Publishers Inc., New York (1957).

DH can also be measured in a way, which is specially suited for control purposes, as the measurement can be performed rapidly and easily and with a reasonable accuracy: Approximately 0.4 g protein hydrolyzate (N × 6.25) is transferred to a beaker containing 40 ml $H_2O$ and 1.5 ml 1 N HCl. The mixture is kept stirred, and the pH is adjusted to 6.00 with 1 N NaOH. Then titration from pH 6.00 to 9.00 is performed with 0.1 N NaOH, and the base consumption, B milliequivalent OH⁻ per g N × 6.25 is calculated. Now, the DH is calculated from the empirical formula DH = (14.10 × B − 6.03)% (Standard deviation: appr. 0.35 DH%)

The DH plays an important part in practice of the invention. The hydrolysis is controlled by means of the DH. When DH reaches a critical value, hydrolysis is interrupted. The DH is both the monitoring parameter of the hydrolysis, and a measure of product suitability i.e. DH of the product is 8–15%, more preferably 9.5–10.5%.

The activated carbon can be any activated carbon with high absorptive power, for example Coporafin B.G.N. from Lurgi Apparate-Technik G.m.b.H., Frankfurt a.M.

After the treatment with activated carbon, the supernatant (solution) can be mixed with liquid sweeteners to constitute a base for a nutritious soft drink, if the additive is intended for a soft drink. The yield of the hydrolysate is generally approximately 65% or above based on the amount of protein in the soy protein starting material. The soft drink base has substantially no bitter off-taste, and it is stable if pasteurized and stored at a temperature of 5° C. The solution can also be concentrated to a syrup-like, viscous material, or dried by spray-drying or freeze-drying, whereby a powder is obtained which is capable of dissolving completely in an aqueous medium.

A preferred embodiment of the process according to the invention comprises the use of a microbial alkaline proteinase, originating from *Bacillus licheniformis*. By using this embodiment, a fast reaction is attained, and in addition this enzyme is acceptable from a toxicological point of view. A suitable enzyme is "ALCALSE" marketed by NOVO INDUSTRI A/S. Another alkaline microbial enzyme is "ESPERASE" (produced by submerged fermentation of an alcalophilic Bacillus).

A preferred embodiment of the process according to the invention comprises a hydrolysis conducted at a pH value between 7.5 and 8.5.

A preferred embodiment of the process according to the invention comprises a hydrolysis conducted at constant pH by means of a pH-stat.

A preferred embodiment of the process according to the invention comprises a hydrolysis conducted to a DH of between 9.5 and 10.5. Hydrolysates exhibiting values of DH inside this interval are characterized by surprisingly beneficial properties as to taste.

A preferred embodiment of the process according to the invention comprises the use of citric acid as the food grade acid for inactivation of the proteinase. Citric acid is advantageous because it is a constituent of most carbonated soft drinks.

A preferred embodiment of the process according to the invention comprises a separation of the supernatant from the precipitate by centrifugation, filtration or decantation.

Also, the invention encompasses the polypeptides manufactured by the process according to the invention.

Previously known procedures for preparing acid soluble polypeptide products bear some resemblance to the process according to the invention, as for example the process described by U.S. Pat. No. 3,876,806. However, both in respect to the process of this invention and to the properties of the product significant differences prevail over what is heretofore known to the art. Practice of this invention results in a product without any significant bitterness of taste, whereas the products produced according to processes known to the art often have a bitter taste (most likely attributable to presence of very low molecular weight peptides).

Studies made with different proteins, notably casein, corn gluten, soy protein isolate, cotton seed protein evidenced that the kinetics of hydrolysis are strongly dependent upon the origin of the protein. During this study the enzyme ("Alcalase") itself, the enzyme concentration, the substrate concentration, the pH and the temperature i.e. all hydrolysis perameters other than the kind of protein were held constant. Casein and corn gluten were hydrolyzed to a greater degree than soy protein. Cotton seed protein was hydrolyzed to a lesser degree than soy protein.

Comparable studies varying only the enzyme, (using soy protein for the substrate), evidenced that the hydrolysis rate and the degree of hydrolysis over a 2 hour hydrolysis period varied greatly protease to protease. The microbial alkaline protease were superior to trypsin with "Alcalase" exhibiting the highest activity levels and "Esperase" close behind in activity levels. Separate studies made at different enzyme concentrations evidenced that hydrolysis time is approximately inversely proportional to enzyme concentration in the range of between 6 Anson Units/kg soy protein and 24 Anson Units kg soy protein. An advantage of the present process is that hydrolysis is carried out under conditions that correspond to a position on the flat part of a Michaelis-Menten plot under which circumstances the enzyme is utilized efficiently and control of hydrolysis is superior.

Studies have shown an interdependence between the degree of hydrolysis and the amount of soluble N produced at different enzyme concentrations. Although a positive correlation exists, a certain degree of hydrolysis does not correspond to an exact calculatable value for soluble N.

In order to demonstrate the feasibility of monitoring conduct of the process of this invention by means of the DH some taste panel evaluations corresponding to protein hydrolysates with different degrees of hydrolysis were carried out.

Thus, different samples of soft drinks differing in respect to DH only were evaluated by a trained panel using triangle tests: three samples, of which two are identical, are presented for the judges in the panel, and the judges are asked to point out the two identical samples and to rank the samples according to bitterness.

The composition of the hydrolysate and the drink and the results of the evaluation is shown below:

Hydrolysate: Soy protein — substrate concentrate = 8.0%, enzyme: "ALCALASE" in an amount of 12 AU/kg protein, pH = 8.0, T = 50° C.

Drink formula: 2.62% protein (N × 6.25) + 9.0% sucrose, adjusted to pH 4.5 with citric acid. No flavours were added. None of the judges complained of any off-taste.

| Number of judges | Number of proper discriminations | Results of evaluation: | | | | | |
|---|---|---|---|---|---|---|---|
| | | Significance for discr. | 1.Sample | | 2.Sample | | Significant diff. |
| | | | DH | Preferred by | DH | Preferred by | |
| 13 | 11 | 99% | 8.9% | 3 | 11.4% | 8 | — |
| 14 | 12 | 99% | 11.4% | 7 | 12.7% | 5 | — |
| 13 | 10 | 99% | 10.1% | 9 | 11.4% | 1 | 99% |

EXAMPLE 1

4,000 ml of a suspension of soy protein isolate, which suspension contains approximately 8% protein (N × 6.25), was hydrolyzed with 0.2% of ALCALASE S 6.0 (calculated with respect to the weight of the protein as corresponding to a proteolytic activity of 12 AU/kg) at pH 8.0 and a temperature of 50° C. ALCALASE S 6.0 has a proteolytic activity of 6.0 Anson units/g. During hydrolysis, which was followed by means of the pH-STAT (Radiometer), the pH was kept constant by addition of 4 N NaOH. After 2 hours' hydrolysis time, a degree of hydrolysis of 10% corresponding to 0.8 meqv/g was obtained*, and 4 M citric acid was then added until the pH reached 3.5. The hydrolysis mixture was then allowed to stand for 30 minutes before the supernatant was decanted through a paper filter using diatomaceous earth as filter aid. The supernatant was treated twice with 0.01% w/v activated carbon powder for 30 minutes at a temperature of 30° C. The activated carbon was Coporafin B.G.N. from Lurgi Apparate-Technik G.m.b.H. Frankfurt a. M. This produced a protein hydrolyzate in 68% yield and with a non-bitter, pleasant taste.

*Complete hydrolysis (DH=100) of soy protein corresponds to 7.9 milliequivalents of base consumption per gram of soy protein.

A beverage with 3% of protein hydrolyzate, 10% of sucrose and 0.005% of Firmenich Tetrarome Lemon P 05.51 was produced and found to be organoleptically acceptable. The beverage was pasteurized in closed vessels and stored in a refrigerator for several weeks. No precipitation or growth of microorganisms occurred, and only a slight discolouration because of Maillard reactions was observed.

EXAMPLE 2

A hydrolysis was performed as in example 1, but with soy concentrate instead of soy isolate. The resultant mixture was a clear liquid which remained stable after addition of 0.1% w/w sorbic acid as a preservative. The liquid could easily be diluted with water, and a standard drink (2.62% N × 6.25 and 9% sucrose) was prepared. The drink was evaluated for bitterness and was reported to be non-bitter.

EXAMPLE 3

Soy isolate was mixed with water in a tri-clover blender F 2116 to constitute a suspension of 8% protein (N × 6.25). 120 liter of the suspension was pumped to a 150 liter stainless steel vessel. (De Danske Mejeriers Maskinfabrik type 4200), which was fitted with a thermostated heat-jacket, a stirrer and a pH electrode. The suspension was hydrolyzed with 0.2% ALCALASE 6.0 (calculated with respect to the weight of the protein as corresponding to a proteolytic activity of 12 AU/kg protein) at pH 8.0 and a temperature of 50° C. During hydrolysis pH was maintained at pH 8.0 by addition of 50–100 ml quanties of 5 N NaOH at regular intervals. The hydrolysis was terminated at a DH of 10% by addition of dry citric acid until pH had dropped to 4.2. After 30 minutes the reaction mixture was centrifuged in a continuous centrifuge (Westphalia SAOH-205). The supernatant was adjusted to pH 5.0 and mixed with 0.1% w/v activated carbon powder. After 30 minutes at 50° C the reaction mixture was filtered in a filter-press and concentrated in a vacuum evaporator until a polypeptide concentration of 23.3% (N × 6.25) was reached. After evaporation a small precipitate was removed by filtering. The resultant mixture was a clear brown liquid which remained stable after addition of 0.1% w/w sorbic acid as a preservative. The liquid could easily be diluted with water, and a standard drink 2.62% (N × 6.25) and 9% sucrose was prepared. The drink was evaluated for bitterness and was reported to be non-bitter.

EXAMPLE 4

The same conditions as in example 3 were used, except that soy concentrate was used instead of soy isolate. The hydrolysis was terminated at DH = 8.2. However, due to the polysaccharide content of the soy concentrate, a minor modification of the separation step (following the citric acid addition) was necessary, since the precipitate was more bulky and less smooth in consistency. Thus, a chamber centrifuge was used for separation.

The resulting mixture was evaporated to a concentration of 16.25% (N × 6.25). After filtering the product was evaluated for bitterness and declared non-bitter.

What is claimed is:

1. Process for the preparation of polypeptides from soy protein soluble in aqueous media at pH's in the range of from 2 to 7 which are suitable for use as an additive for low protein acid food products, which process comprises hydrolyzing soy protein with a microbial, alkaline proteinase in concentration ranging from 4 to 25 Anson units per kg of soy protein at a substrate concentration of between 5 and 20% w/w soy protein, at a pH in the range of from 7.5 to 8.5, until a degree of hydrolysis in the range of from about 8 to 15%, is attained, whereafter the enzyme is inactivated by reduction of pH with a food grade acid, then recovering the supernatant from the precipitate.

2. The process according to claim 1, which further comprises the use of alkaline proteinase from *Bacillus licheniformis*.

3. The process according to claim 1, which further comprises hydrolysing at constant pH.

4. The process according to claim 1, which further comprises hydrolysing to a DH between 9 and 12%.

5. The process according to claim 4, which further comprises hydrolysing to a DH between 9.5 and 10.5%.

6. The process according to claim 1, wherein the enzyme is inactivated by acid addition to a pH below about 4.2.

7. The process according to claim 1, which further comprises using of citric acid as the food grade acid for inactivation of the proteinase.

* * * * *